US006486263B2

(12) United States Patent
Fogg et al.

(10) Patent No.: US 6,486,263 B2
(45) Date of Patent: Nov. 26, 2002

(54) METHOD FOR PRODUCING SATURATED POLYMERS AND SATURATED OR UNSATURATED BLENDS

(75) Inventors: Deryn Elizabeth Fogg, Ottawa (CA); Samantha Dawn Drouin, Gloucester (CA); Fojan Zamanian, North York (CA)

(73) Assignee: University of Ottawa, Ottawa (CA)

( * ) Notice: Subject to any disclaimer, the term of this patent is extended or adjusted under 35 U.S.C. 154(b) by 51 days.

(21) Appl. No.: 09/816,571

(22) Filed: Mar. 26, 2001

(65) Prior Publication Data

US 2002/0040109 A1 Apr. 4, 2002

Related U.S. Application Data

(60) Provisional application No. 60/192,394, filed on Mar. 27, 2000.

(51) Int. Cl.$^7$ .................................................. C08F 8/04
(52) U.S. Cl. ...................... 525/338; 525/332.1; 525/339
(58) Field of Search ................................ 528/338, 339

(56) References Cited

U.S. PATENT DOCUMENTS

| | | |
|---|---|---|
| 5,932,664 A | 8/1999 | Chen et al. |
| 6,107,237 A | 8/2000 | Wagener et al. |

OTHER PUBLICATIONS

McLain, S.J.; McCord, E.F.; Arthur, S.D.; Hauptman, E.; Feldman, J.; Nugent, W.A.; Johnson, L.K.; Mecking, S.; Brookhart, M. 213th ACS National Meeting, San Francisco, Apr. 13–17 (1997); *PMSE Prepr.*, 1997, 76, 246.
Watson, M.D.; Wagener, K.B.; Proceedings PMSEs, 1997, 38, 474.
Watson, M.D.; Wagener, K.B., *Macromolecules*, 2000, 33(9), 3196.
Dias, E.L.; Grubbs, R.H., *Organometallics*, 1998, 17, 2758.
Bielawski, Christopher W.; Louie, Janis; Grubbs, Robert H., J. Am. Chem. Soc. (2000), 122(51), 12872–12873.
Fogg, Deryn E.; Drouin, Samantha, 219th ACS National Meeting, San Francisco, CA, Mar. 28, 2000, INOR–468.
Drouin, S.D.; Yap, G.P.; Fogg, D.E., *Inorg. Chem.* 2000, 39(23), 5412–4.

*Primary Examiner*—Bernard Lipman

(57) ABSTRACT

The present invention provides a method to improve the efficiency of ROMP-hydrogenation and ROMP-hydrogenolysis processes. Thus the invention provides a means for increasing the rate of reaction of the hydrogenation step of the ROMP-hydrogenation process via the addition of non-inert solvent such as methanol. The present invention permits multiple cycles of ROMP-hydrogenation-ROMP and ROMP-hydrogenolysis-ROMP without additional catalyst, thus allowing the formation of tailored polymer blends in a 'one-pot' reaction. Moreover, the ROMP-hydrogenation reactions of the present invention may be carried out at pressures as low as atmospheric pressure.

37 Claims, 1 Drawing Sheet

METHOD FOR PRODUCING SATURATED POLYMERS AND SATURATED OR UNSATURATED BLENDS

CROSS-REFERENCE TO RELATED APPLICATIONS

This application claims the benefit of U.S. Provisional Application No. 60/192,394, filed Mar. 27, 2000.

FIELD OF THE INVENTION

The invention relates to methods of producing saturated polymers and blends of saturated and unsaturated polymers using transition metal catalysts, particularly involving ring-opening metathesis polymerisation (ROMP).

BACKGROUND OF THE INVENTION

Metathesis polymerisation techniques, though increasingly broad in scope, generate unsaturated polymers which are limited in their applications by the susceptibility of the olefinic linkages to oxidative and thermal degradation (1,2, 3). Facile routes to the saturated polymers are thus attractive. Ring-opening metathesis polymerisation (ROMP), followed by hydrogenation, offers a "back-door" route to high-molecular weight, narrow-polydispersity polyolefins, with structures or functionalities inaccessible via conventional Ziegler-Natta or metallocene catalysis. Current methods for reduction of ROMP polymers focus largely on stoichiometric techniques, of which diimide reduction is most common, despite the expense of the p-toluenesulfonhydrazide precursor on a large scale, and evidence for contamination of the polymer by p-toluenesulfonyl groups (4). Limited success has been reported in catalytic reduction via palladium and nickel species (1) though quantitative hydrogenation has been described using RuHCl(CO)(PCy$_3$)$_2$ ("Cy"=cyclohexyl) at elevated temperatures and pressures (165° C., 1400 psi) (2). This Ru species was also the most active catalyst found for reduction of structurally related polybutadiene rubbers by an extensive series of ruthenium catalysts (5). With internal olefins, similarly forcing conditions were invariably required. A one-pot polymerisation of 1,5-cyclooctadiene to yield a saturated product, using a bimetallic Ru catalyst has previously been reported (6).

U.S. Pat. No. 5,312,940 issued May 17, 1994, and U.S. Pat. No. 5,342,909 issued Sep. 10, 1996 (both in the name of Grubbs et al.) disclose compounds and the process for their production, which include compounds of the formula I below (these compounds will hereinafter be termed 'Grubb's catalyst):

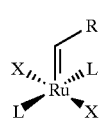

Formula I wherein;
R is selected from hydrogen, or a broad range of organic groups;
each X is independently selected from any anionic ligand;
each L is independently selected from any neutral electron donor; and
wherein any 2, or 3 of each X, and each L, are optionally bonded together to form a chelating agent multidentate ligand.

Compounds encompassed by Grubbs's catalyst are known in the art to be suitable as catalysts for metathesis polymerisation of cyclic olefins. For example, U.S. Pat. No. 5,932,664 issued Aug. 3, 1999, discloses a process for the production of hydrogenated, ring-opened metathesis (co) polymers from cyclic olefins via catalysis using a similar range of compounds in an inert solvent, wherein the catalyst is optionally modified after polymerisation by adding a modifier, followed by hydrogenation without the addition of extra catalyst. U.S. Pat. No. 5,932,664 claims a system wherein the hydrogenation step can occur at pressures between 2 and 200 bar. Typical ROMP polymerisation and subsequent hydrogenation reactions, which utilize the same catalyst, are known in the art as 'tandem' ROMP-hydrogenation reactions, in which a single catalyst effects both polymerisation and hydrogenation/hydrogenolysis steps.

In this regard, the inventors (6) and others (8–12) have focused on development of tandem ROMP-hydrogenation, in which both processes are effected by a single catalyst precursor (as shown in equation 1 below):

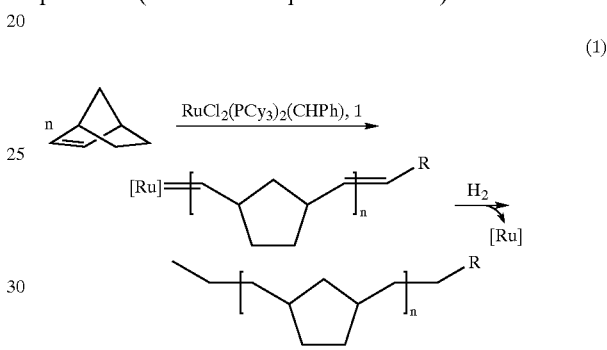

(1)

wherein R is selected from hydrogen or a broad range of organic groups, and n is variable depending upon stoichiometry, and is general in the range of 1–1000.

SUMMARY OF THE INVENTION

It is an object of the invention to improve the efficiency of ROMP-hydrogenation or ROMP-hydrogenolysis processes, and the utility of the materials obtained therefrom. Thus the invention provides a means for increasing the rate of reaction of the hydrogenation step of the ROMP-hydrogenation process as well as a means to perform multiple ROMP-hydrogenation or hydrogenolysis reaction cycles in a 'one-pot' reaction. Moreover, the present invention discloses ROMP-hydrogenation reactions that may be carried out at pressures as low as atmospheric pressure.

In a first embodiment, the present invention provides for a method for producing a substantially saturated polymer, the method comprising the steps of:
(A) generating an unsaturated polymer by polymerising a substrate using ring-opening metathesis polymerisation (ROMP) in the presence of a catalyst comprising a carbene group, the catalyst being of the formula I:

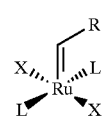

Formula I wherein each L represents independently a neutral two electron donor ligand, each X represents independently a co-ordinating anion, and any two or more of X and L may be connected via a bridging moiety, and R represents hydrogen or an organic radical, to form an unsaturated polymer;

(B) hydrogenating the unsaturated polymer to produce the substantially saturated polymer, wherein the hydrogenation is catalysed by a hydrogenation catalyst generated by modification of the polymerisation catalyst of formula I by replacement of the carbene group with at least one hydrogen, and the hydrogenation reaction is accelerated by a catalysis enhancing non-inert solvent; and (C) adding a Lewis or Brönsted acid or base at any time prior to step (B), as required.

In a second embodiment, the invention provides for a method for producing a polymer, the method comprising the steps of:

(A) generating an unsaturated polymer by polymerising a substrate using ring-opening metathesis polymerisation (ROMP) in the presence of a catalyst comprising a carbene group, the catalyst being of the formula I:

Formula I wherein each L represents independently a neutral two electron donor ligand, each X represents independently a coordinating anion, and any two or more of X and L may be connected via a bridging moiety, and R represents hydrogen or an organic radical, to form an unsaturated polymer;

(B) hydrogenation of the unsaturated polymer to produce the substantially saturated polymer, wherein the hydrogenation is catalysed by a hydrogenation catalyst generated by modification of the polymerisation catalyst of formula I by replacement of the carbene group with at least one hydrogen; and (C) adding a Lewis or Brönsted acid or base at any time prior to step (B), as required;

(D) regenerating the polymerisation catalyst of formula I by reinstallation of the carbene group; and (E) adding a substrate, which may differ from the substrate of step (A), as required;

(F) performing a second polymerisation step, catalysed by the polymerisation catalyst of formula I, as regenerated in step (D).

In a third embodiment, there is provided a method for producing a substantially saturated polymer, the method comprising the steps of:

(A) generating an unsaturated polymer by polymerising a substrate using ring-opening metathesis polymerisation (ROMP) in the presence of a catalyst comprising a carbene group, the catalyst being of the formula I:

Formula I wherein each L represents independently a neutral two electron donor ligand, each X represents independently a co-ordinating anion, and any two or more of X and L may be connected via a bridging moiety, and R represents hydrogen or an organic radical, to form an unsaturated polymer;

(B) hydrogenating the unsaturated polymer to produce the substantially saturated polymer, wherein the hydrogenation is catalysed by a hydrogenation catalyst generated by modification of the polymerisation catalyst of formula I by replacement of the carbene group with at least one hydrogen, under a hydrogen pressure of from about 1 to about 200 bar; and (C) adding a Lewis or Brönsted acid or base at any time prior to step (B), as required.

In a fourth embodiment, there is provided a method for producing a substantially saturated polymer, the method comprising the steps of:

(A) generating an unsaturated polymer by polymerising a substrate using ring-opening metathesis polymerisation (ROMP) in the presence of a suitable catalyst;

(B) hydrogenating the unsaturated polymer to produce the substantially saturated polymer, wherein the hydrogenation is catalysed by a hydrogenation catalyst generated by modification of the polymerisation catalyst of formula I by replacement of the carbene group with at least one hydrogen, and the hydrogenation reaction is accelerated by a catalysis enhancing non-inert solvent; and (C) adding a Lewis or Brönsted acid or base at any time prior to step (B), as required.

In a fifth embodiment, there is provided a method for producing an unsaturated polymer, the method comprising the steps of:

(A) generating an unsaturated polymer by polymerising a substrate using ring-opening metathesis polymerisation (ROMP) in the presence of a catalyst comprising a carbene group, the catalyst being of the formula I:

Formula I wherein each L represents independently a neutral two electron donor ligand, each X represents independently a co-ordinating anion, and any two or more of X and L may be connected via a bridging moiety, and R represents hydrogen or an organic radical, to form an unsaturated polymer;

(B) subjecting the unsaturated polymer to hydrogenolysis, wherein the hydrogenolysis is effected by a hydrogenolysis agent generated by modification of the polymerisation catalyst of formula I by replacement of the carbene group with at least one hydrogen, under a hydrogen pressure of less than about 1 atm; and (C) adding a Lewis or Brönsted acid or base at any time prior to step (B), as required.

DETAILED DESCRIPTION OF THE PREFERRED EMBODIMENTS

Figure 1:
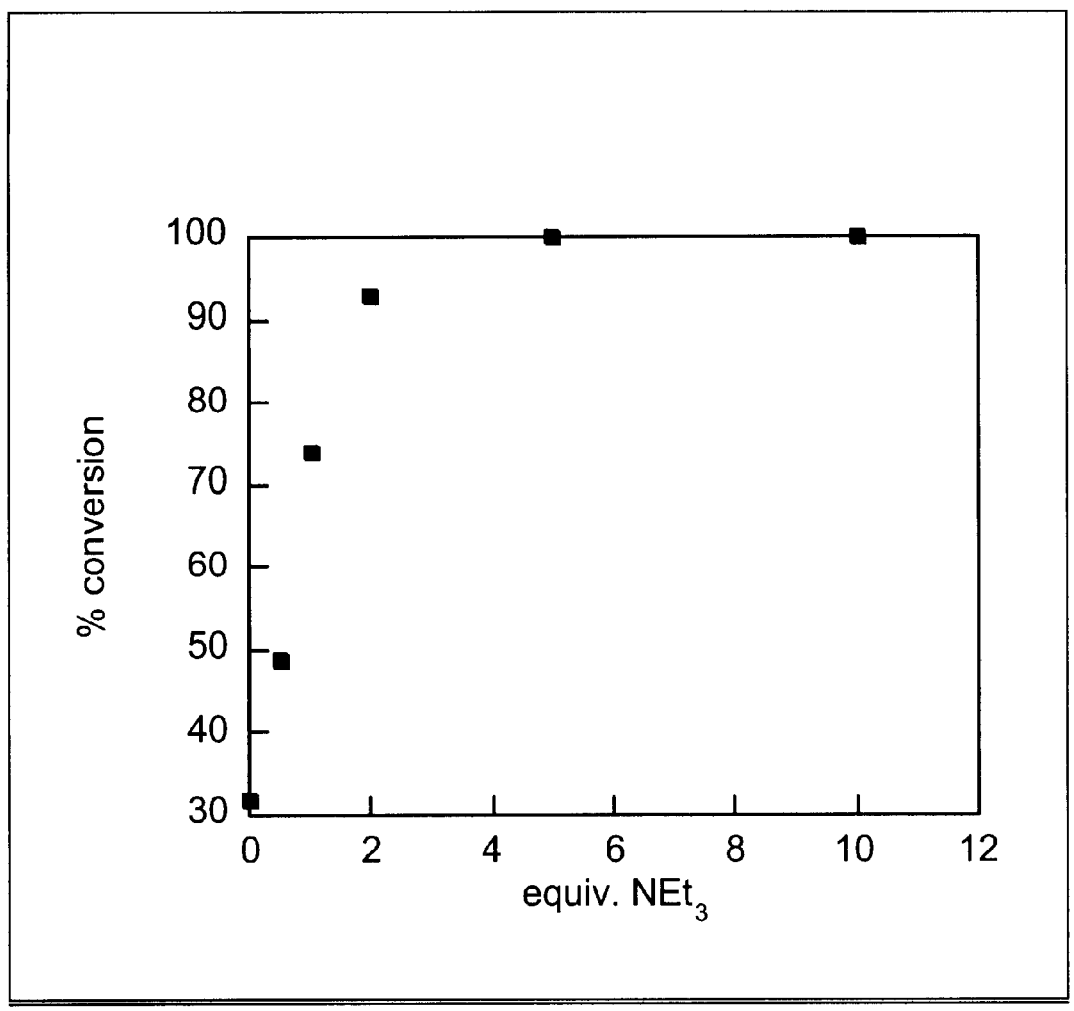
FIG. 1—Conversion vs. equivalents of base for tandem ROMP-hydrogenation of cyclooctene in $CH_2Cl_2$. Reaction conditions: 490 $\mu$mol cyclooctene; 2.4 $\mu$mol of the catalyst (monomer:1=204:1). Polymerisation at RT over 1.5 h; hydrogenation at RT, 1000 psi $H_2$, 24h.

In reference (6), the inventors have described the conversion of Grubbs's catalyst, 1a (see Scheme 1, below), into hydride and dihydrogen complexes (2–4, see Scheme 1, below), by hydrogenolysis under 1 atm H₂ (6). The present invention extends this methodology to disclose for the first time the regeneration of ROMP-active 1b (Scheme 1) following hydrogenation. These transformations provide efficient routes to saturated polymers or polymer blends via sequential processes of ROMP and hydrogenation, ROMP-hydrogenation-ROMP, and ROMP-hydrogolysis-ROMP. An important aspect of the present invention is the exceptionally mild reaction conditions for reduction of these demanding olefin substrates, rivalling those accessible via Rh catalysis (13). Polymer reduction is attainable on gentle warming (50° C.) at pressures as low as 1 atm.

Scheme 1

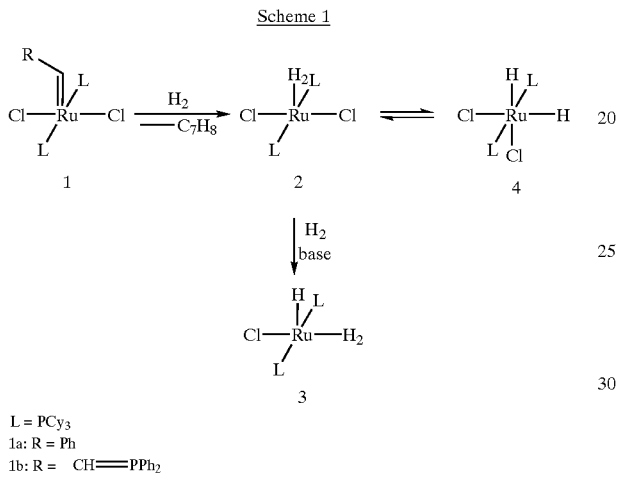

L = PCy₃
1a: R = Ph
1b: R = CH═PPh₂

It has been found that when methanol is used as a non-inert solvent present for hydrogenation, an unexpectedly significant acceleration of hydrogenation catalysis is achieved, to the extent that hydrogenation may be carried out at significantly lower temperatures and pressures than hydrogenation methods described previously. For example, the present invention provides significant improvement over references 8 and 9, which describe methods typically requiring high temperatures and pressures (90–135° C. at 120–400 psi). Moreover, the present invention provides significant improvement over the work by Grubbs and coworkers on double-tandem ROMP-atom transfer radical polymerisation-hydrogenation, which describes reduction of diblock acrylate copolymers at 65° C. and 150 psi H₂ (11). Heterogeneous catalysis involving addition of Si gel following Ru-catalyzed acyclic diene methathesis polymerisation (ADMET) (9) is an alternative methodology. In this regard, high hydrogenation activity is found under mild conditions (RT, 120 psi H₂), though difficulties in separating reduced polymer from the silica support limit the utility of this method to soluble polyolefins.

The substrate for the reaction processes described may be any molecule which is capable of undergoing ROMP. Suitable molecules contain a cyclic moiety, and have at least one endo-cyclic, non-aromatic double bond. Preferred substrates are those containing a 4- to 8-membered cyclic moiety containing at least one non-aromatic double bond. Examples of substrates which produce products with the method of the invention are:

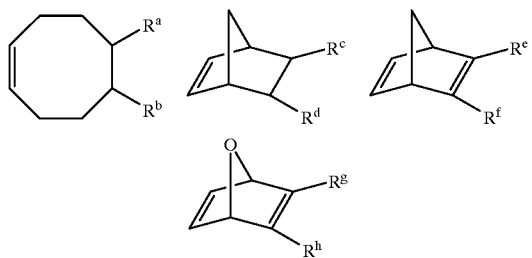

wherein $R^{a-h}$ are independently organic radicals. The nature of $R^{a-h}$ is not particularly limited, and an attractive aspect of the method of the invention is that polymerisation and hydrogenation can be carried out on substrates which "poison" other catalysts. For example, the method of the invention allows access to polymers produced from substrates which have polar substituents.

For the purposes of the present invention, in the catalyst of formula I, preferably each L represents independently a trialkyl or triaryl phosphine. More preferably, L is trialkylphosphine, for example, tri($C_{1-10}$)alkylphosphine. It is particularly advantageous if L represents a sterically bulky trialkylphosphine, for example, tricyclohexylphosphine, or tri-t-butyl phosphine.

The co-ordinating anions X may be the same or different. Preferred anions are selected from halogen, carboxyl, alkoxy, aryloxy and "amido" (a negatively charged deprotonated amine). Particularly preferred anions are Cl⁻ and phenoxy.

R in formula I represents hydrogen or any organic radical which may be attached directly to a terminal double bond, while permitting sufficient electron density in the terminal double bond that it may co-ordinate to the Ru centre. Preferably, R is aryl, CHC($C_{1-6}$alkyl)₂, CHCH($C_{1-6}$alkyl), CHC(aryl)₂ or CHCHaryl. A preferred aryl group is Ph.

Any two or more of X and L may be connected via a bridging moiety. This results in a catalyst in which two or more of X and L form part of a chelating group for the Ru centre. Examples of such chelating groups are of the formula $R'''_2P(CH_2)_nPR'''_2$, $R'''_2P(CH_2)_nNR'''_2$, $R'''_2N(CH_2)_nNR'''_2$, wherein all of $R'''$ are independently alkyl or a preferable cyclohexyl, t-butyl or i-propyl, and n is an integer of 1 to 6, and molecules of the general formula:

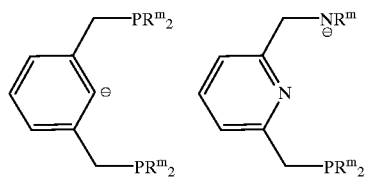

wherein $R'''$ is as defined above.

The unsaturated polymer that is formed is preferably soluble under the reaction conditions.

Preferred reaction conditions for ROMP are known in the art. Often a chlorinated hydrocarbon solvent is used. Preferred solvents are selected from methylene chloride, tetrahydrofuran (THF), benzene, and toluene. The ROMP may be carried out at any temperature that will not degrade the substrate, the catalyst and the polymerised product. It is preferably carried out under an inert atmosphere, such as nitrogen or argon. In a preferred embodiment a temperature of less than about 50° C. is used. The length of time required to complete ROMP to the desired degree may be determined by analysing the reaction mixture, for example, by HPLC, $^1$H or $^{13}$C NMR. This time is usually about 1 hour to about 24 hours, preferably about 1 hour to about 7 hours.

When ROMP is completed to the desired degree, hydrogenolysis of the carbene, followed by hydrogenation of the unsaturated polymer where desired, is initiated by establishing a hydrogen atmosphere. As mentioned above, the presence of a non-inert solvent such as methanol in the hydrogenation reaction significantly accelerates the hydrogenation catalytic process. Without wishing to be limited by theory, it is believed that the presence of solvents of lower dielectric constant than methylene chloride permit formation of co-ordinatively unsaturated dihydrogen complexes II (Scheme 2), which may be further stabilized in methanol solvent by labile interactions of methanol with the metal center. In methylene chloride solvent, ROMP followed by hydrogenolysis results in unsaturated polymer and complex IV (Scheme 2). Complex IV is a poor hydrogenation catalyst even at 1000 psi, due to its co-ordinative saturation. Addition of alcohol or base favours the formation of dihydrogen complexes II or III (Scheme 3), and permits hydrogenation under milder conditions of temperature and pressure. It is possible that II functions directly as a hydrogenation catalyst, but more likely that II serves as a precursor to catalytically active III (Scheme 3). Complex III forms from II on exposure to base and H2.

Scheme 2

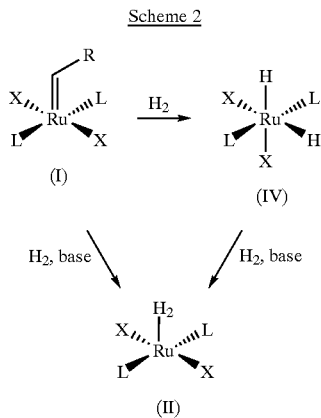

It is possible that II functions directly as hydrogenation catalyst but more likely that II serves as precursor to catalytically active III (Scheme 3). Complex III forms from II on exposure to acid or base and $H_2$.

Scheme 3

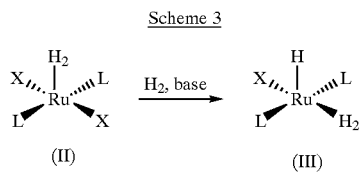

The low reactivity of IV towards hydrogenation can be overcome by use of forcing conditions: quantitative reduction is observed over 24 h at 90° C. Similarly, McLain and coworkers (8) reported complete hydrogenation of ester-functionalized poly(octene) at 135° C. (4 h reaction time), presumably by generating IV in situ. The utility of this protocol is undermined by the formation of highly insoluble polymers at these temperatures, probably by competitive cross-linking reactions before hydrogenation can be completed. Products from reduction at 90° C. proved too insoluble for characterisation.

An additional Lewis or Brönsted acid or base may also be added at any time prior to hydrogenation, as required. The additional Lewis or Brönsted acid or base is preferably selected from a non-coordinating protic acid, a non-coordinating Brönsted acid, an aryloxide, an alkoxide salt, an ether, an amine, an amide and an alcohol. Preferably the ether is selected from cyclic ethers, the amine is selected from di- or trialkyl amines and hindered aromatic amines, and the alcohol is selected from alkyl alcohols. Particularly preferred bases are selected from THF, trimethyl or triethyl amine, 1,8-bis-(dimethylamino)naphthalene (proton sponge), dimethylacetamide (DMA) and a ($C_{1-4}$)alkanol. The Lewis or Brönsted acid or base is preferably added in excess to the catalyst. With amine bases, it is preferred to use more than about a 2-fold excess, more preferred to use more than about a 4-fold excess (with respect to the catalyst). With ethers and alcohols, a 100 to 400 fold excess is preferred. Most preferred is a maximal alcohol concentration permitted without inducing precipitation of the polymer. Also preferred is a proportion of ether in a concentration of 3:1 relative to methylene chloride.

Induction of the hydrogenation step requires conversion of the Grubbs's catalyst to a hydrogenation catalyst. For this purpose, a positive hydrogen atmosphere may be maintained, but is not essential to the hydrogenation reaction. In a preferred embodiment, the hydrogen pressure is from about 15 to about 200 psi. At higher pressures, hydrogenation proceeds rapidly, but becomes less attractive economically.

The method of the invention also permits hydrogenation at hydrogen pressures as low as 1 atmosphere. $H_2$-hydrogenolysis of 1 (see Scheme 1) liberates one equivalent of toluene to form a tautomeric mixture of Ru(II) and Ru(IV) species (2 and 4, respectively; Scheme 1) (6). The corresponding reaction of the Ru-terminated polymer chain likewise extrudes 2/4 and unsaturated polymer. Under 1 atm $H_2$, in the absence of alcohol, the reaction is selective for hydrogenolysis (Path A, Scheme 4; illustrated for poly(NBE)): no change in the ratio of olefinic to aliphatic protons is detected by $^1$H NMR over 24 h. While zero reduction at 1 atm $H_2$ is unsurprising for homogeneous hydrogenation of internal olefins, we find modest conversions even at 1000 psi in methylene chloride solvent. This low activity is attributed to the predominance of coordinatively saturated 4 (scheme 1), the sole spectroscopically observable species in $CH_2Cl_2$. Steric factors, more predictably, are also manifest: higher conversions are observed for poly(octene) than poly(NBE) (32% vs. 14%), as expected on the basis of the higher steric hindrance β to the olefin in the latter (5). Poly(octene), in turn, is much less readily reduced than the small-molecule substrate trans-3-hexene, which is 83% reduced under these reaction conditions. Steric hindrance by macromolecular substituents is inherent in polymer hydrogenation (14). It is particularly acute in these systems, in which each olefinic unit is not only part of the polymer backbone, but also of predominantly trans geometry (15). In hydrogenation of diene polymers, 1,2 double bonds are reduced faster than 1,4 double bonds, and cis- 1,4 units faster than trans- 1,4 units (16).

Scheme 4

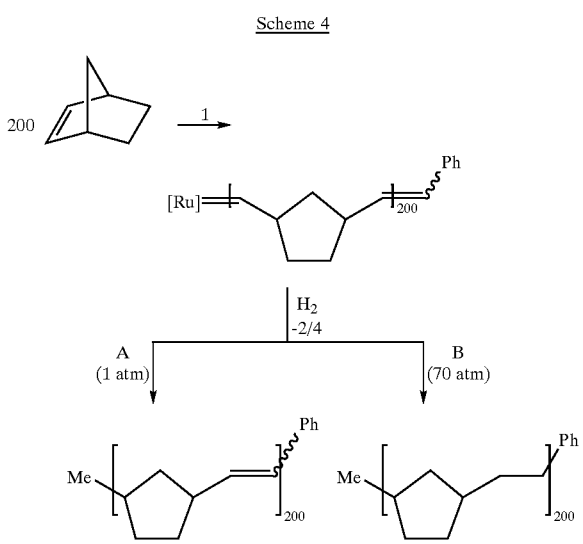

Complete hydrogenation of ester-functionalized poly (octene) at 135° C. and 400 psi using 1b (Scheme 1) as catalyst precursor has previously been reported by McLain et al. (8). In this reference, complex 4 (Scheme 1) is presumably generated in situ, suggesting that its low reactivity can be overcome by use of forcing conditions. However, as mentioned above, it is important to note that reduction of poly(octene) by this approach can result in formation of insoluble polymers, probably by competitive cross-linking reactions. Products from reduction at 90° C. likewise proved incompletely soluble, inhibiting accurate measurement of conversions by NMR. The present invention teaches away from that of McLain and coworkers.

Much faster hydrogenation rates are observed in neat THF, in which both 4 (Scheme 1) and its coordinatively unsaturated Ru(II) tautomer are evident by $^{31}$P NMR. The strong solvent dependence of the tautomeric equilibrium has been established (6). THF is problematic as a solvent for tandem ROMP-hydrogenation, however, as both polymerisation and hydrogenolysis are inefficient in this solvent. This difficulty is circumvented by carrying out ROMP in $CH_2Cl_2$, and diluting the reaction mixture with THF for subsequent hydrogenation. Use of 3:1 THF-$CH_2Cl_2$ permits complete saturation of poly(octene) at RT within 24 h at 1000 psi $H_2$, though conversions drop sharply on decreasing the pressure to 100 psi (Table 1).

TABLE 1

Conversion to poly(ethylene) via tandem ROMP-hydrogenation of cyclooctene[a]

| Entry | Solvent | Additive[b] | pH$_2$ (psi) | Conversion (%)[c] |
|---|---|---|---|---|
| 1 | $CH_2Cl_2$ | — | 1000 | 32 |
| 2 | 3:1 THF-$CH_2Cl_2$ | — | 1000 | 100 |
| 3 | 3:1 THF-$CH_2Cl_2$ | — | 100 | 9 |
| 4 | $CH_2Cl_2$ | $NEt_3$ | 1000 | 100 |
| 5 | $CH_2Cl_2$ | $NEt_3$ | 100 | 85 |
| 6 | 3:1 THF-$CH_2Cl_2$ | $NEt_3$ | 100 | 55 |

[a]Conditions: 490 μmol cyclooctene; 2.4 μmol catalyst (monomer:1 = 204:1). ROMP in 2 mL $CH_2Cl_2$ (RT, 1.5 h); diluted as indicated to 10 mL for hydrogenation (RT, 24 h).
[b]Added immediately prior to hydrogenation; 12 μmol (5 equiv per Ru).
[c]Average of 3 runs, ±3%.

Amine additives are commonly used in hydrogenation catalysis to amplify catalyst activity. Treatment of $RuCl_2$ (PPh$_3$)$_3$ with NEt$_3$/H$_2$, for example, results in heterolytic activation of H$_2$ and irreversible formation of the catalytically-active hydrochloride complex (17). Deprotonation of dihydrogen within a series of chlororuthenium complexes by NEt$_3$ in $CD_2Cl_2$ has also been described (18). Transformation of 2/4 (Scheme 1) into hydridochloro species 3 (Scheme 1) by treatment with H$_2$/NEt$_3$ (6) is associated with a dramatic increase in hydrogenation activity (Table 1, Entries 4, 5). Yields of saturated polymer are quantitative over 24 h at 1000 psi at RT, and remain remarkably high at pressures as low as 100 psi. Further optimization was not pursued in consequence of the discovery of higher activities in the presence of alcohol solvents.

The observed non-stoichiometric requirement for base (FIG. 1) may reflect slow chlorination of 3 (Scheme 1) by $CH_2Cl_2$ to yield comparatively unreactive 4 (Scheme 1) over the timescale of hydrogenation (6,19). The susceptibility of transition-metal hydrides to chlorination by halocarbon solvents has long been known, and such solvents are frequently avoided in small-molecule reduction (17). Their use in polymer hydrogenation—as in the present case—is dictated by both reactivity and solubility considerations. Of the common solvents, only $CH_2Cl_2$ and THF fully dissolve these polymer substrates, as described above.

The functions of THF and base may be viewed as redundant in that both give access to coordinatively unsaturated species (Scheme 1, species 2 or 3, respectively). Entry 6 of Table 1 indicates that when NEt$_3$ is used, THF cosolvent is no longer required, and that activity is in fact much higher in neat $CH_2Cl_2$. The difference may be due to the lower dielectric constant of THF (7.2, vs. 9 for $CH_2Cl_2$) or coordination of THF to the metal centre. Inhibition by coordinating solvents in hydrogenation catalysis has been noted elsewhere (20,21).

Of particular interest in these studies is the potential effect of tandem catalysis on polymer molecular weight and polydispersity. ROMP of bicyclic olefins permits much more precise evaluation of such parameters than ROMP of cyclooctenes. As low solubility complicates NMR analysis of poly(norbornane), these studies utilized 5-norbornene-2-methylether 5 (Scheme 5), the saturated polymer of which is readily soluble in $CDCl_3$. Tandem ROMP-hydrogenation of 5 gives near-monodisperse polyolefin (PDI=1.04), with no change in molecular weight.

The hydrogenation step of the ROMP-hydrogenation process may be carried out at any temperature that will not substantially degrade the unsaturated polymer substrate, the catalyst and the saturated polymer product. An advantage of the method of the invention over known methods, is that it provides considerable control over molecular weight and polydispersity. The use of temperatures lower than about 90° C. is preferred as it avoids cross-linking of the polymer product. The method of the invention can be used at room temperature or 50° C., as required. The length of time required to complete hydrogenation to the desired degree may be determined by analysing the reaction mixture, for example, by HPLC, $^1$H or $^{13}$C NMR. This time is usually about 1 hour to about 48 hours, preferably about 1 hour to about 24 hours. For certain polymer end-uses it may be desirable to stop hydrogenation before it has gone to completion, in order to isolate a partially saturated polymer.

After hydrogenation has occurred, the catalyst can be regenerated by adding a terminal alkyne, preferably a β-halo terminal alkyne, for example 3-chloro-3-methyl-1-propyne, or diazyalkane, a diazo compound or a cyclopropene derivative. Polymerisation and hydrogenation can be carried out again. This permits the preparation of tailored polymer blends.

During extensive experimentation, the inventors discovered that methanol can act as an unexpectedly powerful accelerating agent for the hydrogenation step of ROMP-hydrogenation using Grubbs's catalysts.

A major limitation in the industrial utilization of metallocene/post-metallocene catalysts for polyolefin synthesis is the difficulty in processing narrow-polydispersity polymers. Solutions involve use of reactor cascades, or the batch synthesis and subsequent combination of different molecular weight fractions, in which the lower molecular-weight fraction serves as a plasticizer for the higher. Extension of the tandem-catalysis methodology affords an alternative in which heavy metal residues are kept to a minimum. Complete, clean conversion of 3 or 4 to carbene 5, as shown in Scheme 5, ($^1$H, $^{31}$P NMR evidence) is effected by treatment with 3-chloro-3-methyl-1-propyne (22,23) in either CH$_2$Cl$_2$/NEt$_3$ or THF. A double-tandem process can thus be designed to give access to tailored polymer blends, the mixture depending on the hydrogen pressure, as well as the solvent and additives employed. ROMP-hydrogenolysis-ROMP yields a mixture of unsaturated polymers, while ROMP-hydrogenation-ROMP yields a mixture of saturated and unsaturated materials. A final hydrogenation step is possible in either case, resulting in polyolefin blends via a triple-tandem process. ROMP-hydrogenation-ROMP is disclosed by way of example in Examples 3, 5, and 6. It should be noted that this approach likewise permits synthesis of tailored blends of unsaturated polymers.

Scheme 5

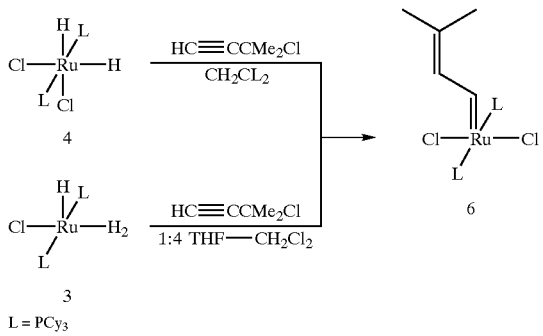

EXAMPLES

Techniques. Reactions were carried out under N$_2$ using standard Schlenk or drybox techniques. $^1$H NMR (200 MHz) spectra were recorded on a Varian Gemini 200 MHz spectrometer. Chemical shifts are listed downfield from trimethylsilyl in parts per million and were referenced to the residual solvent proton peak. $^{31}$P NMR (121 MHz) spectra were recorded on a Varian XL-300 MHz spectrometer, and reported relative to 85% aqueous H$_3$PO$_4$. Gel permeation chromatography (GPC) data were obtained with CH$_2$Cl$_2$ as eluent (flow rate 1.0 mL/min; samples 1–2 mg/mL) using an HPLC system equipped with a Waters model 610 pump, a Rheodyne model 7125 injector with a 100 mL injection loop, Waters HR-4, HR-6 and HR-3 columns in series and a Wyatt DAWN light-scattering detector. Molecular weights and polydispersities are reported versus commercially available polystyrene standards ranging from 1.3×103 to 3.15× 106 g/mol MW.

Materials. Grubbs's complex (Strem) was used as received. Norbornene (NBE), cis-cyclooctene (COE), and trans-3-hexene (Aldrich) were distilled from Na and NaOH, respectively, and stored in a drybox. Ultrapure carrier grade H$_2$ (Praxair) was passed through a Deoxo catalytic purifier and Drierite before use. CDCl$_3$, CD$_2$Cl$_2$ and C$_6$D$_6$ were dried over activated sieves (Linde 4 Å) and degassed by consecutive freeze/pump/thaw cycles. Preparation of RuHCl(H$_2$)(PCy$_3$)$_2$ and cyclooctene derivatives such as the monomers 5-acetoxy-1-cyclooctene and 5-bromo-1-cyclooctene is well-known in the art.

Example 1

Representative Procedure for Tandem ROMP-hydrogenation

ROMP: A solution of Grubbs's catalyst (2 mg, 2.4 μmol) in CH$_2$Cl$_2$ (2 mL) was stirred rapidly as cyclooctene (64 μL, 490 μmol, [M]/[C]=204) was added via syringe. Stirring was continued until ROMP was complete (1.5 h for this monomer).

Hydrogenation: The solution was diluted (with THF, MeOH and/or CH$_2$Cl$_2$) to 10 mL, and base or acid added where applicable (details listed in Table 2). The solution was loaded into a glass-lined Parr mini-autoclave, which was assembled, removed from the drybox, purged with H$_2$, pressurized to the required pressure (in the case of reactions at 15 psi, the vessel pressure was slowly drained to atmospheric pressure via a needle valve), and stirred at RT or 50 C for the required period. The solvent was then removed under vacuum, and conversions determined by $^1$H NMR (CDCl$_3$). The average of 3 trials (±3%) is reported in Table 2.

Example 2

Regeneration of a Carbene Complex: RuCl$_2$(CH—CH=CMe$_2$)(PCy$_3$)$_2$ (i) A solution of Grubbs' catalyst (43.6 mg, 0.053 mmol) in THF (10 mL) was treated with H$_2$ (1000 psi) for 48 h. To the resulting orange solution was added 3-chloro-3-methyl-1-propyne (18 μL, 0.159 mmol). Concentration and precipitation with hexanes gave RuCl$_2$(CH—CH=CMe$_2$)(PCy$_3$)$_2$ as a deep red product (38 mg, 92%). $^{31}$P{$^1$H} NMR (CH$_2$Cl$_2$): δ36.7 (s). $^1$H NMR (C$_6$D$_6$, 200 MHz): δ19.9 (d, J$_{H-P}$=11.5 Hz), δ8.3 (d, J$_{H-P}$=11.5 Hz).

(ii) To a solution of 3 (Scheme 1, when X=Cl, L=L=PCy$_3$) (20 mg, 0.024 mmol) and NEt$_3$ (8.6 μL, 0.12 mmol) in 2 mL CH$_2$Cl$_2$ was added 3-chloro-3-methyl-1-propyne (3.3 μL, 0.029 mmol), producing a deep red colour. Yield: 100% by NMR.

Example 3

ROMP-Hydrogenation-ROMP

Following hydrogenation as described in Example 1, the autoclave was depressurised and opened in a drybox. A solution of 3-chloro-3-methyl-1-propyne in CH$_2$Cl$_2$ (100 μL of a 0.024 M solution) was added, causing an immediate colour change from yellow to pale pink. Norbornene (25 μL, 0.26 mmol) was added, and the reaction was left to stir for 2 h. Hydrogenation was then carried out as before.

Example 4

The use of a Non-inert Solvent to Accelerate the Catalysis of Hydrogenation

The use of methanol as a non-inert solvent in the reactions, permitting quantitative conversions under mild reaction conditions (RT, 15–100 psi). This discovery was unexpected given the common use of methanol to terminate ROMP and precipitate polymer products. Optimization details (cyclooctene monomer) are summarized in Table 2. Reaction rates increase with increased MeOH concentration (Entries 1, 3), with an upper limit of ~20% MeOH being imposed by solubility of polyethylene: at higher MeOH concentrations, incompletely-reduced polymer precipitates from solution. Lower conversions are found for isopropanol than methanol (Entry 11), suggesting a role for alcohol in coordination to the metal centre (20,25). Stoichiometric hydrogenolysis experiments carried out in $CD_2Cl_2$-methanol reveal formation of Grubbs's catalyst species 4 (see Scheme 1) and a new species characterized by a $^{31}P$ NMR singlet at 31.3 ppm, which has not yet been fully characterized. These NMR data rule out, however, the possibility of decarbonylation of methanol to give known, highly active hydrogenation catalyst $RuHCl(CO)(PCy_3)_2$ ($\delta_p$=46.6 ppm) (26). Interestingly, addition of $NEt_3$ hinders the efficacy of alcohol solvents (Entry 5), suggesting a mechanistic difference between alcohol-promoted and amine-promoted catalysis.

TABLE 2

Effect of alcohol cosolvent on tandem ROMP-hydrogenation of cyclooctene[a]

| Entry | Alcohol (%) | Additive[b] | Conversion | $H_2$ Pressure psi | Temperature C. | Time (h) |
|---|---|---|---|---|---|---|
| 1 | MeOH (10%) | — | 51 | 100 | RT | 4 |
| 2 | MeOH (10%) | $HBF_4$ | 76 | 100 | RT | 4 |
| 3 | MeOH (20%) | — | 83 | 100 | RT | 4 |
| 4 | MeOH (20%) | $HBF_4$ | 89 | 100 | RT | 4 |
| 5 | MeOH (20%) | $NEt_3$ | 21 | 100 | RT | 4 |
| 6 | MeOH (20%) | $PCy_3$ | 0 | 100 | RT | 4 |
| 7 | MeOH (20%) | 4-Bu$^t$-PhOK | 100 | 15 | 50 | 24 |
| 8 | MeOH (20%) | $HBF_4$[c] | 74 | 15 | 50 | 24 |
| 9 | MeOH (20%) | $HBF_4$ | 93 | 50 | RT | 24 |
| 10 | MeOH (20%) | — | 97 | 50 | 50 | 24 |
| 11 | IPA (10%) | — | 54 | 100 | RT | 4 |
| 12 | IPA (20%) | $NEt_3$ | 22 | 100 | RT | 4 |

[a]Conditions: 490 μmol cyclooctene; 2.4 μmol catalyst (monomer : Grubb's catalyst = 204:1). ROMP in 2 mL $CH_2Cl_2$(RT, 1.5 h); diluted as indicated to 10 mL for hydrogenation (RT, 4h).
[b]Added immediately prior to hydrogenation. $HBF_4$; 2.6 μmol (1.1 equiv per Ru), unless otherwise noted. Other additives ($NEt_3$, 4-Bu$^t$-PhOK, and $PCy_3$); 12 μmol (5 equiv per Ru).
[c]HBF4: 473 μmol (200 equiv per Ru).

[a]Conditions: 490 μmol cyclooctene; 2.4 μmol catalyst (monomer: Grubbs's catalyst=204:1). ROMP in 2 mL $CH_2Cl_2$ (RT, 1.5 h); diluted as indicated to 10 mL for hydrogenation (RT, 4 h). [b]Added immediately prior to hydrogenation. $HBF_4$; 2.6 μmol (1.1 equiv per Ru), unless otherwise noted. Other additives ($NEt_3$, 4-Bu$^t$-PhOK, and $PCy_3$); 12 μmol (5 equiv per Ru). [c]HBF4: 473 μmol (200 equiv per Ru).

Yi and coworkers recently proposed phosphine dissociation as a key step in hydrogenation via $RuHCl(PCy_3)_2(CO)$ (27). Enhanced activity in the presence of non-coordinating protic acids (i.e. $HBF_4$) is proposed to be due to scavenging of $PCy_3$. Use of $HBF_4$ in conjunction with methanol indeed increases conversions in our systems, with high yields of reduced polymer under unexpectedly mild reaction conditions, including pressures as low as 15 psi. Phosphine dissociation is supported by the complete inhibition of catalysis in the presence of excess $PCy_3$. A diphosphine intermediate is generally thought to be operative in hydrogenation via chelating diphosphine complexes, the difference possibly arising from the trans- vs. cis-disposition of the phosphine ligands.

Homogeneous hydrogenation of internal olefins via Wilkinson's catalyst, $RhCl(PPh_3)_3$, requires elevated temperatures (60° C.) at 30 psi for reduction of polybutadiene (13). The long-standing hydrogenation catalyst $RuHCl(CO)(PPh_3)_3$ requires extreme conditions (150° C., 286 psi) for the reduction of cyclohexene (28).

Example 5

ROMP-Hydrogenolysis-ROMP

ROMP-hydrogenolysis-ROMP was carried out using 5-norbornene-2-methylether (5-methoxymethylbicyclo [2.2.1]hept-2-ene) as monomer ([monomer]:[Ru]=400:1). The first ROMP step was followed by hydrogenolysis at 1 atm $H_2$ in the presence of $NEt_3$, after which the carbene functionality was reinstalled by addition of propargyl chloride. A second ROMP step was then effected by addition of 100 equiv of monomer. Following completion of ROMP ($^1H$ NMR), GPC analysis of the isolated polymer blend confirmed the presence of a bimodal molecular weight distribution (PDI=1.11 for both fractions). ROMP-hydrogenation-ROMP was carried out by a similar process, with $H_2$ pressures of 1000 psi in the second step. Methyltetracyclododecane (MTD), rather than 5-norbornene-2-methylether, was used in the second ROMP stage, affording access to a blend of two structurally distinct polymers. $^1H$ NMR analysis revealed distinct peaks for the saturated polynorbornane derivative and unsaturated poly-MTD.

Example 6

Screening for Functional Group Tolerance

Screening for functional group tolerance. Tandem ROMP-hydrogenation of 5-norbornene-2-methylether was carried out in the presence of a range of functionalized additives in order to assess the robustness of the procedure. Near-monodisperse polyolefin was isolated in good yields in the presence of tertiary amine, alcohol, and ester additives (Table 3). Carboxylic acid (Table 3: entry 5) gave low molecular weight polymer in poor yields. This is likely due to interference in the ROMP process: polymerisation of acid-functionalized monomers by very similar catalysts was likewise unsuccessful (24), while addition of acid can enhance hydrogenation efficiencies, as noted in Example 4. 5-Bromo-1-cyclooctene, 5-methoxy-1-cyclooctene, and 5-acetoxy-1-cyclooctene were likewise reduced in good yields with PDIs consistent with those known in the art to be characteristic of their unsaturated precursors.

TABLE 3

Tandem ROMP-hydrogenation of 5-norbornene-2-methylether in the presence of various additives[a].

| Entry | Additive | Hydrogenation solvent[e] | Yield (%) | $10^{-3} M_n$[g] | PDI[f] |
|---|---|---|---|---|---|
| 1 | $NEt_3$[b] | $CH_2Cl_2$ | 85 | 25.0 | 1.04 |
| 2 | MeOH (20%) | $CH_2Cl_2$ + 20% MeOH | 75 | 29.4 | 1.03 |
| 3 | $CH_3CO_2CH_2CH_3$[c] | $CH_2Cl_2$ + 20% MeOH[d] | 74 | 32.7 | 1.04 |
| 4 | $CH_3CO_2CH_2CH_3$ | $CH_2Cl_2$ + 20% MeOH[e] | 83 | 35.1 | 1.02 |
| 5 | $(CH_3)_3CCO_2H$[f] | $CH_2Cl_2$ + 20% MeOH | 24 | 18.0 | 1.14 |

[a]Reaction conditions: RT; 980 μmol 5-norbornene-2-methylether, 4.8 μmol 1; ROMP continued for 30 min in 2 mL $CH_2Cl_2$; diluted as indicated to 10 mL for hydrogenation (RT, 1000 psi, 24 h). Complete reduction confirmed by $^1H$ NMR.
[b]3.6 μL (5 equiv) $NEt_3$.
[c]88 μL (200 equiv) $CH_3CO_2CH_2CH_3$.
[d]MeOH added prior to ROMP.
[e]MeOH added after ROMP.
[f]125 μL (200 equiv) $(CH_3)_3CCO_2H$.
[g]Measured by LS-GPC in $CH_2Cl_2$.

[a]Reaction conditions: RT; 980 μmol 5-norbornene-2-methylether, 4.8 μmol 1; ROMP continued for 30 min in 2 mL $CH_2Cl_2$; diluted as indicated to 10 mL for hydrogenation (RT, 1000 psi, 24 h). Complete reduction confirmed by $^1H$ NMR. [b]3.6 μL (5 equiv) $NEt_3$. [c]88 μL (200 equiv) $CH_3CO_2CH_2CH_3$. [d]MeOH added prior to ROMP. [e]MeOH added after ROMP. [f]125 μL (200 equiv) $(CH_3)_3CCO_2H$. [g]Measured by LS-GPC in $CH_2Cl_2$.

Example 7

Preparation of Polymer Blends: ROMP-Hydrogenolysis-ROMP

In a drybox, a solution of 1 (4 mg, 4.9 μmol) in $CH_2Cl_2$ (4 mL) was stirred rapidly as 5-norbornene-2-methylether (271 mg, 2.0 mmol, [M]/[C]=408) in $CH_2Cl_2$ (1 mL) was added via pipette. The reaction was stirred at RT for 0.5 h, and $NEt_3$ (3.5 μL, 25 μmol) was added. Hydrogen gas was bubbled through the solution for 1 h, then it was stirred under $H_2$ (1 atm) for 15 h, during which time there was a colour change from pink to bright yellow. The solution turned pink again on addition of 3-chloro-3-methyl-1-propyne (1 μL, 7.2 μmol). A second portion of 5-norbornene-2-methylether (68 mg, 0.49 mmol, [M]/[C]=100) in $CH_2Cl_2$ (1 mL) was added and the solution was stirred at RT for 30 min preceding addition of 2 drops ethyl vinyl ether. The polymer blend was isolated by addition of the concentrated solution (0.5 mL) to stirring MeOH. Yield: 278 (82%). $^1H$ NMR shows all characteristic peaks for both the unsaturated and the saturated polymer. GPC shows one main peak representing the 400-mer, with $M_n$=54,300 and PDI=1.11. There is a second (smaller) peak, representing the 100-mer, with $M_n$=19,000 and PDI=1.11.

Example 8

Preparation of Polymer Blends: ROMP-Hydrogenation-ROMP

In a drybox, a solution of 1 (4 mg, 4.9 μmol) in $CH_2Cl_2$ (4 mL) was stirred rapidly as 5-norbornene-2-methylether (136 mg, 1.0 mmol, [M]/[C]=408) in $CH_2Cl_2$ (1 mL) added via pipette. The reaction was stirred at RT for 0.5 h, and $NEt_3$ (3.5 μL, 25 μmol) was added. The solution was loaded into a glass-lined autoclave which was removed from the drybox, purged with hydrogen and pressurized to 1000 psi. The solution was stirred at RT for 24 h. The autoclave was depressurized and opened in the drybox. During hydrogenation, the solution colour changed from pink to bright yellow. The solution turned pink again on addition of 3-chloro-3-methyl-1-propyne (1 μL, 7.2 μmol). The second monomer, methyltetracyclododecane (MTD) (43.6 mg, 0.25 mmol, [M]/[C]=51) in $CH_2Cl_2$ (1 mL) was added via pipette and the solution was stirred at RT for 30 min. The polymerisation was quenched by addition of 2 drops ethyl vinyl ether. The polymer blend was isolated by addition of the concentrated solution (0.5 mL) to stirring MeOH. Yield: 158 mg (88%). Though GPC shows a single peak (Mn=38 610, PDI=1.1), $^1H$ NMR shows a mixture of poly(MTD) and the saturated polynorbornane derivative: 5.69–5.24 (bm, olefin, poly(MTD)), 3.31–3.05 (br s, polynorbornane derivative), 3.15 (m, polynorbornane derivative), 2.89–1.01 (br m, both polymers).

References

1) Sohn, B.H.; Gratt, J.A.; Lee, J.K.; Cohen, R.E. J. Appl. Polym. Sci. 1995, 58, 1041.
2) Yoshida, Y.; Yoshinari, M.; Iko, A.; Komiya, Z. Polymer Journal 1998, 30, 819.
3) Kohara, T. Macromol. Symp. 1996, 101, 571.
4) Edwards, H.G.M.; Farrell, D.W.; Johnson, A.F.; Lewis, I.R.; Ward, N.J.; Webb, N. Macromolecules 1992, 25, 525.
5) McManus, N.T.; Rempel, G.L. J Macromol. Sci., Rev. Macromol. Chem. Phys. 1995, C35, 239.
6) Drouin, S.D.; Yap, G.P.A.; Fogg, D.E. Inorg. Chem. 2000, 39, 5412.
7) Fogg D.E. and Drouin S.D., 219$^{th}$ National ACS Meeting, San Francisco, CA, U.S., March 28, 2000
8) McLain, S.J.; McCord, E.F.; Arthur, S.D.; Hauptman, E.; Feldman, J.; Nugent, W.A.; Johnson, L.K.; Mecking, S.; Brookhart, M. Proceedings PMSE 1997, 76, 246.
9) Watson, M.D.; Wagener, K.B. Macromolecules 2000, 33, 3196.
10) Dias, E.L.; Grubbs, R.H. Organometallics 1998, 17, 2758.
11) Bielanski, C.W.; Louie, J.; Grubbs, R.H. J. Am. Chem. Soc. 2000, 122, 12872.
12) Chen; Bayer: U.S. Pat. No. 5,932,664, issued August 3, 1999.
13) Mohammadi, N.A.; Ling, S.S.M.; Rempel, G.L. Polym. Prepr. 1986, 27, 95.
14) Maréchal, E. Chemical Modification of Synthetic Polymers; Pergamon: Toronto, 1989; Vol. 6.
15) Schwab, P.; Grubbs, R.H.; Ziller, J.W. J. Am. Chem. Soc. 1996, 118, 100.
16) Schulz, D.N. Hydrogenation; Wiley-Interscience: New York, 1987; Vol. 7, pp 807.
17) James, B.R. Comprehensive Organometallic Chemistry; Wilkinson, G., Ed.; Pergamon Press: New York, 1982; Vol. 8, pp 285.
18) Rocchini, E.; Mezzetti, A.; Ruegger, H.; Burckhardt, U.; Gramlich, V.; Zotto, A.D.; Martinuzzi, P.; Rigo, P. Inorg. Chem. 1997, 36, 711.

-continued

References

19) No conversion of amine to the ammonium salt is evident by NMR in CD2Cl2, suggesting that nucleophilic attack on the solvent is either negligible, or that - in the absence of a base sufficiently strong to deprotonate the salt - an equilibrium is set up in which the free base is favoured.
20) Burk, M.; Martinez, J.P.; Feaster, J.E.; Cosford, N. Tetrahedron 1994, 50, 4399.
21) Chaloner, P.A.; Esteruelas, M.A.; Joo, F.; Oro, L.A. Homogeneous Hydrogenation; Kluwer Academic Publishers: Dordrecht, The Netherlands, 1994; Vol. 15.
22) Wilhelm, T.E.; Belderrain, T.R.; Brown, S.N.; Grubbs, R.H. Organometallics 1997, 16, 3867.
23) Wolf, J.; Stuer, W.; Grunwald, C.; Gevert, O.; Laubender, M.; Werner, H. Eur. J. Inorg. Chem. 1998, 1827.
24) Maughon, B.R.; Grubbs, R.H. Macromolecules 1997, 30, 3459.
25) Fogg, D.E.; James, B.R.; Kilner, M. Inorg. Chim. Acta 1994, 222, 85.
26) Yi, C.S.; Lee, D.Y. Organometallics 1999, 18, 5152.
27) Yi, C.S.; Lee, D.W.; He, Z. Organometallics 2000, 19, 2909.
28) Huh, S.; Cho, Y.; Jun, M.-J.; Whang, D.; Kim, K. Polyhedron 1994, 13, 1887.

What is claimed is:

1. A method for producing a substantially saturated polymer, the method comprising the steps of:
   (A) generating an unsaturated polymer by polymerising a substrate using ring-opening metathesis polymerisation (ROMP) in the presence of a catalyst comprising a carbene group, the catalyst being of the formula I:

$$X_{\prime\prime\prime\cdot}\underset{L}{\overset{R}{\underset{Ru}{\parallel}}}\cdot^{\prime\prime\prime}L$$

Formula I wherein each L represents independently a neutral two electron donor ligand, each X represents independently a co-ordinating anion, and any two or more of X and L may be connected via a bridging moiety, and R represents hydrogen or an organic radical, to form an unsaturated polymer;
   (B) hydrogenating the unsaturated polymer to produce the substantially saturated polymer, wherein the hydrogenation is catalysed by a hydrogenation catalyst generated by modification of the polymerisation catalyst of formula I by replacement of the carbene group with at least one hydrogen, and the hydrogenation reaction is accelerated by a catalysis enhancing non-inert solvent; and
   (C) adding a Lewis or Brönsted acid or base at any time prior to step (B), as required.

2. A method according to claim 1, wherein the catalysis enhancing non-inert solvent is selected from the group consisting of an alcohol, an ether or water.

3. A method according to claim 2, wherein solvent is methanol in a concentration that does not induce precipitation of the polymer.

4. A method according to claim 1, wherein both of L represent independently a trialkyl phosphine, both of X represent independently Cl⁻ or phenoxy, and R represents Ph, $CHC(CH_3)_2$, $CHC(Ph)_2$ or CHCHPh.

5. A method according to claim 1, wherein the Lewis or Brönsted acid or base is selected from an ether, an amine and an alcohol.

6. A method according to claim 1, wherein the Lewis or Brönsted acid or base is added in 4- to 400-fold excess to the catalyst.

7. A method according to claim 1, wherein the Lewis or Brönsted acid or base is selected from trialkyl amines, hindered aromatic amines, cyclic diethers and alkanols.

8. A method according to claim 1, wherein the Lewis or Brönsted acid or base is selected from triethylamine, THF and 1,8-bis-(dimethylamino)naphthalene.

9. A method according to claim 1, wherein during step (B) the temperature is maintained at less than about 90° C.

10. A method according to claim 1, wherein during step (B) a hydrogen pressure of less than about 200 psi is maintained.

11. A method according to claim 1, wherein each L represents tricyclohexylphosphine, each X represents Cl⁻, and R represents Ph.

12. A method according to claim 1, wherein all steps are carried out in a chlorinated hydrocarbon, THF or mixtures thereof.

13. A method according to claim 1, wherein the Lewis or Brönsted acid or base is selected from triethylamine, THF and 1,8-bis-(dimethylamino)naphthalene.

14. A method according to claim 1, which further comprises the steps of:
   (D) regenerating the polymerisation catalyst of formula I by reinstallation of the carbene group;
   (E) adding a substrate, which is the same or different from the substrate of step (A), as required; and
   (F) performing a second polymerisation step, catalysed by the polymerisation catalyst of formula I, as regenerated in step (D).

15. A method according to claim 14, wherein the carbene group is reinstalled to regenerate the polymerisation catalyst by the addition of propargyl chloride.

16. The method of claim 14, further comprising addition steps corresponding to steps (A) to (F), thus permitting repeated cycles of polymerisation and hydrogenation without the need for the addition of more catalyst of formula I.

17. A method for producing a polymer, the method comprising the steps of:
   (A) generating an unsaturated polymer by polymerising a substrate using ring-opening metathesis polymerisation (ROMP) in the presence of a catalyst comprising a carbene group, the catalyst being of the formula I:

$$X_{\prime\prime\prime\cdot}\underset{L}{\overset{R}{\underset{Ru}{\parallel}}}\cdot^{\prime\prime\prime}L$$

Formula I wherein each L represents independently a neutral two electron donor ligand, each X represents independently a co-ordinating anion, and any two or more of X and L may be connected via a bridging moiety, and R represents hydrogen or an organic radical, to form an unsaturated polymer;
   (B) hydrogenation of the unsaturated polymer to produce the substantially saturated polymer, wherein the hydrogenation is catalysed by a hydrogenation catalyst generated by modification of the polymerisation catalyst of formula I by replacement of the carbene group with at least one hydrogen; and
   (C) adding a Lewis or Brönsted acid or base at any time prior to step (B), as required;
   (D) regenerating the polymerisation catalyst of formula I by reinstallation of the carbene group; and (E) adding a substrate, which is the same or different from the substrate of step (A), as required; and (F) performing a second polymerisation step, catalysed by the polymerisation catalyst of formula I, as regenerated in step (D).

18. A method according to claim 17, wherein each L represents independently a trialkyl phosphine, each X represents independently Cl⁻ or phenoxy, and R represents Ph, CHC(CH$_3$)$_2$, CHC(Ph)$_2$ or CHCHPh.

19. A method according to claim 17, wherein the Lewis or Brönsted acid or base is selected from an ether, an amine and an alcohol.

20. A method according to claim 17, wherein the Lewis or Brönsted acid or base is added in 4- to 400-fold excess to the catalyst.

21. A method according to claim 17, wherein the Lewis or Brönsted acid or base is selected from trialkyl amines, hindered aromatic amines, cyclic diethers and alkanols.

22. A method according to claim 17, wherein the Lewis or Brönsted acid or base is selected from triethylamine, THF and 1,8-bis-(dimethylamino)naphthalene.

23. A method according to claim 17, wherein during step (B) the temperature is maintained at less than about 90° C.

24. A method according to claim 17, wherein during step (B) a hydrogen pressure of less than about 200 psi is maintained.

25. A method according to claim 17, wherein both of L represent tricyclohexylphosphine, both of X represent Cl⁻, and R represents Ph.

26. A method according to claim 17, wherein all steps are carried out in a chlorinated hydrocarbon, THF or mixtures thereof.

27. A method according to claim 17, wherein the Lewis or Brönsted acid or base is selected from triethylamine, THF and 1,8-bis-(dimethylamino)naphthalene.

28. A method according to claim 17, wherein the carbene group is reinstalled to regenerate the polymerisation catalyst by the addition of propargyl chloride.

29. The method of claim 17, further comprising addition steps corresponding to steps (A) to (F), thus permitting repeated cycles of polymerisation and hydrogenation without the need for the addition of more catalyst of formula I.

30. The method of claim 1, wherein the hydrogenation is carried out at a pressure of from about 1 to about 200 bar.

31. The method of claim 17, wherein the step of hydrogenation is carried out at a pressure of from about 1 to about 200 bar.

32. A method for producing a substantially saturated polymer, the method comprising the steps of:

(A) generating an unsaturated polymer by polymerising a substrate using ring-opening metathesis polymerisation (ROMP) in the presence of a catalyst comprising a carbene group, the catalyst being of the formula I:

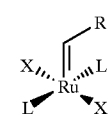

Formula I wherein each L represents independently a neutral two electron donor ligand, each X represents independently a co-ordinating anion, and any two or more of X and L may be connected via a bridging moiety, and R represents hydrogen or an organic radical, to form an unsaturated polymer;

(B) hydrogenating the unsaturated polymer to produce the substantially saturated polymer, wherein the hydrogenation is catalysed by a hydrogenation catalyst generated by modification of the polymerisation catalyst of formula I by replacement of the carbene group with at least one hydrogen, under a hydrogen pressure of from about 1 to about 200 bar; and (C) adding a Lewis or Brönsted acid or base at any time prior to step (B), as required.

33. A method for producing a substantially saturated polymer, the method comprising the steps of:

(A) generating an unsaturated polymer by polymerising a substrate using ring-opening metathesis polymerisation (ROMP) in the presence of a suitable catalyst;

(B) hydrogenating the unsaturated polymer to produce the substantially saturated polymer, wherein the hydrogenation is catalysed by a hydrogenation catalyst generated by modification of the polymerisation catalyst of formula I by replacement of the carbene group with at least one hydrogen, and the hydrogenation reaction is accelerated by a catalysis enhancing non-inert solvent; and (C) adding a Lewis or Brönsted acid or base at any time prior to step (B), as required.

34. A method according to claim 33, wherein the step of hydrogenation is carried out at a pressure of from about 1 to about 200 atm.

35. A method for producing an unsaturated polymer, the method comprising the steps of:

(A) generating an unsaturated polymer by polymerising a substrate using ring-opening metathesis polymerisation (ROMP) in the presence of a catalyst comprising a carbene group, the catalyst being of the formula I:

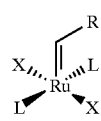

Formula I wherein each L represents independently a neutral two electron donor ligand, each X represents independently a coordinating anion, and any two or more of X and L may be connected via a bridging moiety, and R represents hydrogen or an organic radical, to form an unsaturated polymer;

(B) subjecting the unsaturated polymer to hydrogenolysis, wherein the hydrogenolysis is effected by a hydrogenolysis agent generated by modification of the polymerisation catalyst of formula I by replacement of the carbene group with at least one hydrogen, under a hydrogen pressure of less than about 1 atm; and (C) adding a Lewis or Brönsted acid or base at any time prior to step (B), as required.

36. A method according to claim 35, further comprising the steps of:

(D) regenerating the polymerisation catalyst of formula I by reinstallation of the carbene group; and (E) adding a substrate, which is the same or different from the substrate of step (A), as required;

(F) performing a second polymerisation step, catalysed by the polymerisation catalyst of formula I, as regenerated in step (D), thereby obtaining a polymer blend.

37. A method according to claim 17 for generating a saturated/unsaturated polymer blend, wherein the method further comprises the step of:

(G) subjecting the polymer to hydrogenolysis, wherein the hydrogenolysis is effected by a hydrogenolysis agent generated by modification of the polymerisation catalyst of formula I by replacement of the carbene group with at least one hydrogen, under a hydrogen pressure of less than about 1 atm.

* * * * *